US010699443B2

(12) United States Patent
Fuller et al.

(10) Patent No.: US 10,699,443 B2
(45) Date of Patent: Jun. 30, 2020

(54) REDUCING THE SEARCH SPACE FOR REAL TIME TEXTURE COMPRESSION

(71) Applicant: Microsoft Technology Licensing, LLC, Redmond, WA (US)

(72) Inventors: Martin Jon Irwin Fuller, Warwick (GB); Daniel Gilbert Kennett, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 23 days.

(21) Appl. No.: 15/970,266

(22) Filed: May 3, 2018

(65) Prior Publication Data
US 2019/0304138 A1    Oct. 3, 2019

Related U.S. Application Data

(60) Provisional application No. 62/649,997, filed on Mar. 29, 2018.

(51) Int. Cl.
*G06T 9/00* (2006.01)
*G06T 1/20* (2006.01)
(Continued)

(52) U.S. Cl.
CPC ............ *G06T 9/00* (2013.01); *G06T 1/20* (2013.01); *G06T 7/40* (2013.01); *H04N 19/40* (2014.11); *H04N 19/426* (2014.11)

(58) Field of Classification Search
None
See application file for complete search history.

(56) References Cited

U.S. PATENT DOCUMENTS

2003/0234786 A1    12/2003 Cole et al.
2012/0320067 A1    12/2012 Iourcha et al.
(Continued)

FOREIGN PATENT DOCUMENTS

WO    2017118303 A1    7/2017

OTHER PUBLICATIONS

McAnlis C., "Building a blazing fast ETC2 compressor", https://medium.com/@duhroach/building-a-blazing-fast-etc2-compressor-307f3e9aad99, [online], [retrieved Jul. 20, 2019], Sep. 2016. (Year: 2016).*

(Continued)

*Primary Examiner* — Kee M Tung
*Assistant Examiner* — Patrick F Valdez
(74) *Attorney, Agent, or Firm* — Ray Quinney & Nebeker; Tiffany Healy

(57) ABSTRACT

Methods and devices for real time texture compression may include accessing graphics hardware incompatible compressed textures in a format incompatible with the GPU, and a metadata file associated with the graphics hardware incompatible compressed textures, wherein the metadata file includes at least one hint that provides information to use for compression of decompressed textures from the graphics hardware incompatible compressed textures into hardware compatible compressed textures. The methods and devices may include converting the graphics hardware incompatible compressed textures into the decompressed textures. The methods and devices may include selectively compressing the decompressed textures into the hardware compatible compressed textures usable by the GPU according to the at least one hint from the metadata file. The methods and devices may include transmitting the hardware compatible compressed textures to the GPU.

21 Claims, 6 Drawing Sheets

(51) Int. Cl.
　　　*G06T 7/40*　　　(2017.01)
　　　*H04N 19/426*　　(2014.01)
　　　*H04N 19/40*　　　(2014.01)

(56) References Cited

U.S. PATENT DOCUMENTS

2013/0054835 A1* 2/2013 Sliger .................. H04L 69/04
　　　　　　　　　　　　　　　　　　　709/247
2017/0201758 A1* 7/2017 Moguillansky ...... H04N 19/136

OTHER PUBLICATIONS

Krajcevski et al, "GST: GPU-decodable Supercompressed Textures", ACM, SA '16 Technical Papers, Dec 2016. (Year: 2016).*
Ström et al, "iPACKMAN: High-Quality, Low-Complexity Texture Compression for Mobile Phones", Graphics Hardware, 2005. (Year : 2005).*
Paltashev et al, "Texture Compression Techniques", Scientific Visualization, 6(1), pp. 106-146, 2014. (Year: 2014).*
Oom D. "Real-Time Adaptive Scalable Texture Compression for the Web", Master's Thesis, University of Gothenburg, 2016. (Year: 2016).*
"Understanding BCn Texture Compression Formats", Retrieved From: http://www.reedbeta.com/blog/understanding-bcn-texture-compression-formats/, Feb. 12, 2012, 18 pages.
"International Search Report and Written Opinion Issued in PCT Application No. PCT/US2019/023497", dated May 29, 2019, 14 Pages.

* cited by examiner

REDUCING THE SEARCH SPACE FOR REAL TIME TEXTURE COMPRESSION

RELATED APPLICATION

This application claims priority to U.S. Application No. 62/649,997 titled "Reducing the Search Space for Real Time Texture Compression," filed Mar. 29, 2018, which is incorporated herein by reference in its entirety.

BACKGROUND

The present disclosure relates to computer devices, graphics processing, and texture compression.

Video games are experiencing problems with textures taking up too much image size, e.g., hard disk space, optical media space, and/or download size. For example, a video game may take up 100 GB of memory, of which 30-60 GB may be the textures. There is another problem with the speed with which games can load in textures having a relatively large memory footprint. Games generally use block compression at runtime to save memory, bandwidth, and cache pressure, however, these schemes have a fixed compression ratio. Other schemes present far better compression ratio for the textures but may not be in a format directly usable by the graphics processing unit (GPU). Moreover, there is a desire for an increasing amount of textures with more variations.

Thus, there is a need in the art for improvements in texture compression.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a graphics processing unit (GPU); a memory to store data and instructions including an application, graphics hardware incompatible compressed textures in a format incompatible with the GPU, and a metadata file associated with the graphics hardware incompatible compressed textures; a processor in communication with the memory; and an operating system in communication with the memory, the processor, the GPU, and the application. The application may be operable to access the metadata file and the graphics hardware incompatible compressed textures, wherein the metadata file includes at least one hint that provides information to use for compression of decompressed textures from the graphics hardware incompatible compressed textures into hardware compatible compressed textures; convert the graphics hardware incompatible compressed textures into the decompressed textures; selectively compress the decompressed textures into the hardware compatible compressed textures usable by the GPU according to the at least one hint from the metadata file; and transmit the hardware compatible compressed textures to the GPU.

Another example implementation relates to a method for real time texture compression. The method may include accessing, by an application executing on the computer device graphics hardware incompatible compressed textures in a format incompatible with the GPU, and a metadata file associated with the graphics hardware incompatible compressed textures, wherein the metadata file includes at least one hint that provides information to use for compression of decompressed textures from the graphics hardware incompatible compressed textures into hardware compatible compressed textures. The method may include converting the graphics hardware incompatible compressed textures into the decompressed textures. The method may include selectively compressing the decompressed textures into the hardware compatible compressed textures usable by the GPU according to the at least one hint from the metadata file. The method may include transmitting the hardware compatible compressed textures to the GPU.

Another example implementation relates to computer-readable medium storing instructions executable by a computer device. The computer-readable medium may include at least one instruction for causing the computer device to access graphics hardware incompatible compressed textures in a format incompatible with the GPU, and a metadata file associated with the graphics hardware incompatible compressed textures, wherein the metadata file includes at least one hint that provides information to use for compression of decompressed textures from the graphics hardware incompatible compressed textures into hardware compatible compressed textures. The computer-readable medium may include at least one instruction for causing the computer device to convert the graphics hardware incompatible compressed textures into the decompressed textures. The computer-readable medium may include at least one instruction for causing the computer device to selectively compress the decompressed textures into the hardware compatible compressed textures usable by the GPU according to the at least one hint from the metadata file. The computer-readable medium may include at least one instruction for causing the computer device to transmit the hardware compatible compressed textures to the GPU.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
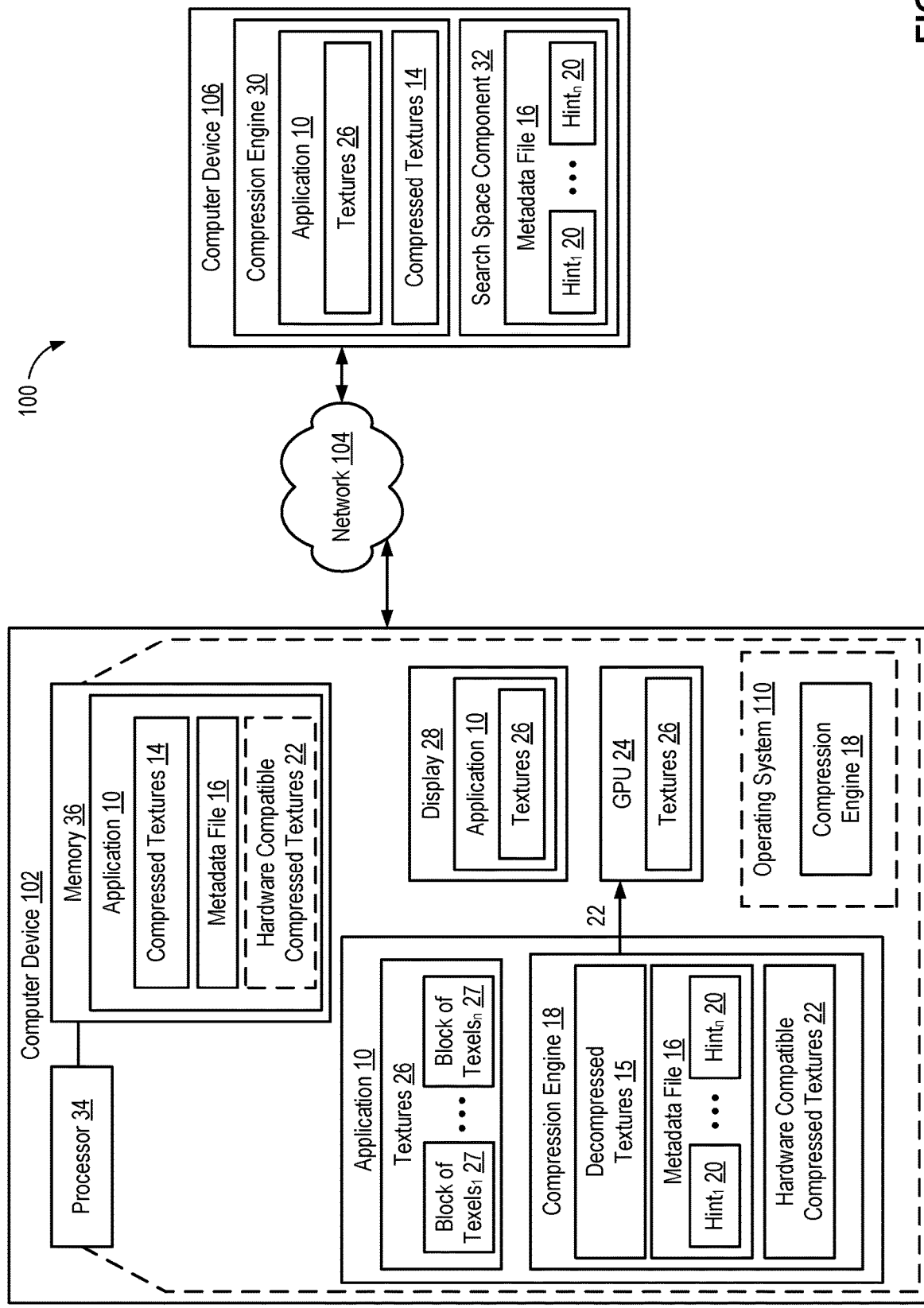
FIG. 1 is a schematic block diagram of an example computer device in accordance with an implementation of the present disclosure.

This disclosure relates to devices and methods for real time block compression of textures for computer games. The devices and methods may speed up the process of converting between one compression scheme, for example, suitable for loading textures from a hard disk drive (HDD), and block compressing the result for use by the graphics processing unit (GPU).

Block compression is used by computer games for storing textures, since block compression may be read directly by the GPU, saving memory, bandwidth, and/or cache pressure on a computer device. However, it is possible to achieve higher compression ratios at acceptable image quality using other types of compression, for example, but not limited to, machine learning image compression, joint photographic experts group (JPEG) compression, wavelet compression, and/or general purpose lossless compression (e.g., zip, lzma, and kraken). Using a compression format with a higher compression ratio on textures for games may be desirable for reducing input/output bandwidth and/or for reducing the size of games on the hard disk, optical media, or when downloaded over the internet. Unfortunately, these other compressions schemes are not directly usable by the GPU.

Further, the most complex forms of block compression may allow each 4×4 block of texels of a texture to dictate a different compression mode. Each mode may have a number of shapes, rotations of those shapes, and a number of end points with indices to interpolate between the end points. As such, the search space during block compression may be very large, thereby dictating a correspondingly large amount of processing resources and time to identify a configuration for block compression.

The disclosed devices and methods may reduce the search space during block compression by providing a metadata file with one or more hints as to which mode, shape, and/or end points to choose during block compression. The metadata file with the one or more hints may be stored along with a compressed texture, compressed in a format incompatible with the GPU, so that when the compressed texture is loaded and decompressed at runtime and/or at an install time of the application, the metadata file may be accessed and the one or more hints used to perform the block compression.

The metadata file with the one or more hints may be generated offline. In an implementation, the metadata file and the one or more hints may be created offline using a compressor that runs a compression algorithm in a format compatible with the GPU (e.g., block compression). For example, the block compressor may test options in the search space to determine a configuration for a block compression of decompressed textures having a measurement of error between a source image and the hardware compatible compressed textures within an error threshold. The identified options may be stored in the metadata file so as to define one or more hints that may be loaded with the texture and used to reduce the search space at runtime when the block compression processing is occurring and/or during installation of the application. For example, the metadata file may include hints as to which mode, shape, and/or end points to choose for use in the block compression.

In another implementation, the metadata file and the one or more hints may be created offline using a trained machine learning model, such as a Machine Learning Adversarial Network, to predict compression options for each block. For example, a Machine Learning Adversarial Network may be used to block compress images quickly, by shortcutting the search space, predicting which are the best modes, shapes, and/or end points to use based on learning achieved during a training phase of the adversarial network. Different machine learning networks and/or trained models may be created for different texture types (e.g., normal map, diffuse, light map, etc.) and different content types (e.g., brick, grass, metal, skin, etc.) These machine learning networks/models may learn based on textures associated with a game and/or application as an offline process.

As such, at runtime and/or installation of the application, the devices and methods may quickly convert the GPU-incompatible compressed texture into a format usable by the GPU by using the one or more hints provided in the metadata file to reduce the search space during the block compression of the decompressed textures. Thus, based on the present disclosure, textures may be compressed using a higher compression ratio compression algorithms (relative to GPU-compatible compression algorithms) for storage and/or transmission, and the corresponding decompressed textures may be easily and quickly compressed in real time into a format usable by the GPU.

Referring now to FIG. 1, an example system 100 for use in connection with real time texture compression may include a computer device 102 that may include a graphics-based application 10 having textures 26, such as but not limited to a game, that is to be run by the processor 34 and/or operating system 110 of the computer device 102. For example, application 10 may be accessed by computer device 102 from the hard disk, optical media, and/or downloaded over the internet.

Application 10 may include one or more textures 26 included in one or more scenes of application 10. Textures 26 may provide information about an image rendered in the application 10. For example, textures 26 may include a bitmap of pixel colors that give an object the appearance of texture. Textures 26 may be used by game developers to create realism in applications 10 and/or computer games by providing detailed surfaces and/or colors. For example, textures 26 may be used to make a concrete barrier in a scene of application 10 look realistic. Another example may include a plurality of textures 26 being layered to make a player's skin look realistic. For example, the texture 26 may include one or more texture layers, such as one texture layer that may include veins to include in the skin, while another texture layer emulates light absorption on the skin, and another texture layer may be used to emulate sweat on the player's skin. Another example may include using a variety of textures 26 to make grass in the scene look realistic. As such, variations of textures 26 may be used by game developers to make scenes of application 10 look realistic. Textures 26 may include blocks of texels 27 (up to m, where m is an integer). For example, the blocks of texels 27 may be, but not limited to, a 4×4, 8×4, 4×8, and/or an 8×8 block of texels 27. Each texels may be a pixel in the texture 26 and may also be the smallest unit of a texture that can be read or written to. In addition, each block of texels 27 may specify a mode, featuring 1 to 4 related components, such as, but not limited to, red green blue (RGB), red green blue alpha (RGBA), XY, and XYZ, additionally a shape, a number of endpoints, and indices indicating how to interpolate between the endpoints per texel. For instance, in one implementation that should not be construed as limiting, an example block of texels 27 may be 1 of 8 modes, each with up to 32 shapes, each with 2 to 4 endpoints, and with different number of bits awarded to the index for each texel. As such, these components define a search space for determining a manner in which to compress the texture 26.

According to the present disclosure, application 10 may include compressed textures 14 so that when application 10 is transmitted to computer device 102 and/or stored in memory 36, the size of application 10 is greatly reduced, and thus, reducing input/output bandwidth and/or the size of application 10 on the hard disk, optical media, or downloaded over the internet. For example, the compressed textures 14 may be compressed using any one of a plurality of compression algorithms or schemes that are incompatible with the GPU, but which provide a substantially greater compression ratio as compared to a GPU-compatible compression algorithm/scheme (e.g., block compression). For example, hardware compatible compressed texture formats may be 0.5 or 1 bytes per texel, while machine learning can go as low as half of 0.5 or 1 bytes per texel. The compressed textures 14 may be compressed using machine learning image compression, JPEG, wavelet, general purpose lossless compression, and/or other forms of compression that result in a relatively high compression ratio. As noted, however, the compressed textures 14 may not be directly usable by the GPU. As such, the resulting hardware incompatible image generated by compressed textures 14 may be block compressed prior to usage by the GPU.

Application 10 may also include a metadata file 16 with one or more hints 20 (e.g., up to n hints, where n is an integer) as to which mode, shape and/or end points to choose for the textures 26 when block compressing the texture 26 for application 10 at runtime. For example, the hints 20 may indicate that while there may be 8 different modes for an identified region of a texture 26, this identified region of a texture 26 only uses modes 1 and 2. In addition or alternatively, for example, the hints 20 may indicate which shapes are common shapes for the identified region of a texture 26. The hints 20 may also provide information regarding a subset of the search space defined by a subset of one or more of the mode, the shape, or the endpoints to choose for compressing the decompressed textures into hardware compatible compressed textures that includes less than all of the potential combinations that make up the search space. For example, the subset may include one or more of the mode, the shape, or the endpoints, or one or more of a combination of the mode, the shape, or the endpoints. As such, the hints 20 may be used to reduce the search space when determining how to efficiently compress the textures 26 at runtime.

Reducing the search space for block compressing the textures 26 may speed up the recompression of textures from a GPU incompatible compressed form, to a GPU compatible compressed form. As such, by having the capability to quickly create the GPU compatible compressed textures, the size of games downloaded from the internet may be reduced and/or provide more content onto the fixed size optical media by using the GPU incompatible texture compression techniques. In addition, users may be able to install more games on their hard disk at once. More resources of computer device 102 may also be available for displaying the application 10. Moreover, by reducing the amount of data to stream off of the disk (by storing the textures as compressed textures 14), additional resources of computer device 102 may be available for other portions of the application 10. For example, the application 10 may have more space for audio or a wider variety of meshes may be provided.

In an implementation, the present apparatus and methods generate the compressed textures 14 and metadata file 16 offline using one or more computer devices 106. Computer device 106 may include a compression engine 30 that receives the textures 26 for the applications 10. Compression engine 30 may compress the textures 26 into compressed textures 14. For example, compression engine 30 may use one or more of a plurality of forms/techniques/algorithms of compression, using GPU-incompatible formatting, and compare the results in order to identify a form of compression that results in a high compression ratio including, but not limited to, machine learning image compression, JPEG, general purpose lossless compression, and/or wavelet.

Computer device 106 may also include a search space component 32 that may test options in the search space to determine a configuration for a block compression of decompressed textures. The search space component 32 may identify one or more hints 20 to provide when compressing the textures 26. The one or more hints 20 may provide guidance as to which modes, shapes, and/or end points may produce the best quality blocks when compressing the textures 26 into a hardware compatible compressed texture 22. An example search space component 32 for use with computer device 106 is illustrated in FIG. 2.

Figure 2:
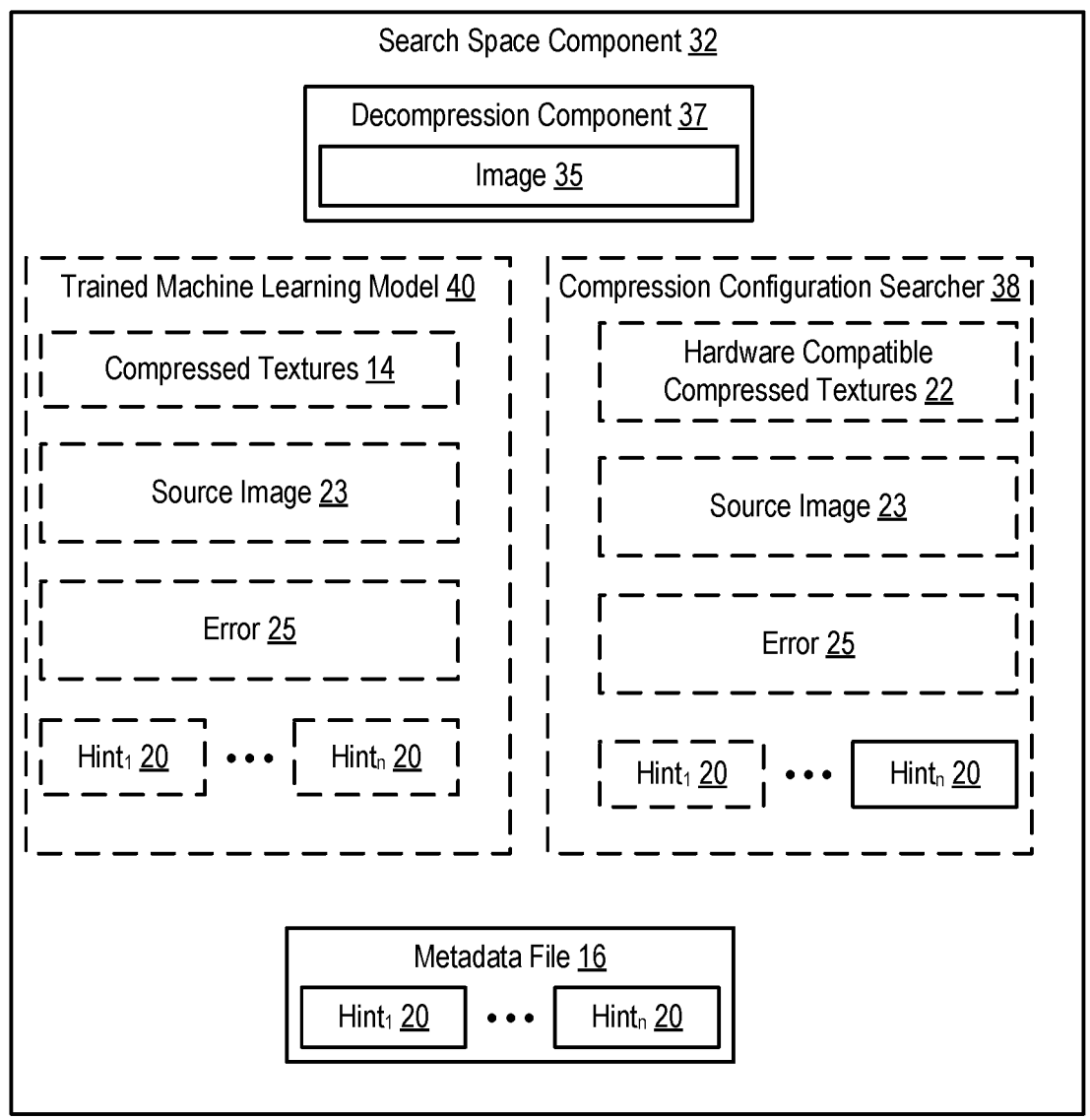
FIG. 2 is an example of a search space component for use with a computer device in accordance with an implementation of the present disclosure.

Referring to FIG. 2, search space component 32 may include a decompression component 37 that decompresses the compressed textures 14 into hardware compatible decompressed textures, such as images 35. The decompressed textures may include a plurality of blocks of texels 27 that include one or more of a shape, a mode, or endpoints. For example, decompression component 37 may decompress the compressed textures 14 using a machine learning neural network.

In one implementation, search space component 32 may include a compression configuration searcher 38 that searches the full search space, or until a search limit is hit, on the images 35 to determine configurations for hardware compatible compressed textures 22, such as a block compressed number (BCN) texture, to determine best results for regions of the textures. Compression configuration searcher 38 may try every combination of mode, shape and/or end points of images 35. The end points may have a huge search space. For example, one end point can be any of the 16 colors in a block, while the other endpoint can be any of the other 15. Another example may include compression configuration searcher 38 selecting a color which is close to the colors used in the texture but does not feature in the original source image. During the search performed by the compression configuration searcher 38 on the images 35, compression configuration searcher 38 may identify a configuration for a block compression of the decompressed textures by testing of the search space, for example, by trying different combinations of shapes, end points, and/or modes.

Compression configuration searcher 38 may determine a measurement of error 25 between the source image 23 and the hardware compatible compressed textures 22. Compression configuration searcher 38 may continue searching all combinations and take the lowest error 25, or compression configuration searcher 38 may terminate the search when an acceptable error threshold is hit (e.g., the measured error 25 is below the error threshold). By using the measurement of error 25, the quality of the hints 20 may be improved and/or an improvement in the quality of the hardware compatible compressed textures 22 may be achieved by selecting images that are within an error threshold of the source image 23. Moreover, the best results for a region of the textures may be based at least upon the results obtained within the acceptable error threshold and/or when the lowest error 25 is hit.

In another implementation, compression may be time limited. As such, compression configuration searcher 38 may terminate the search within a certain time period and/or after a number of iterations are performed by compression configuration searcher 38. Thus, the best results for regions of the hardware compatible compressed textures 22 may be based on the results obtained within a certain time and/or a number of iterations performed by the search.

Once the compression configuration searcher 38 identifies the best configuration for the block one or more hints 20 may be provided for the hardware compatible compressed texture 22, such as, the end points, the shapes, and/or the modes used when generating the configuration for the block that generated the best quality. The one or more hints 20 may provide guidance as to which modes, shapes, and/or end points may produce the best quality blocks for the hardware compatible compressed texture 22.

In another implementation, search space component 32 may include a trained machine learning model 40 that may perform a trained machine learning search on the compressed textures 14 to predict which may be good compression options for each block. The trained machine learning model 40 may identify repetition and/or features that may be important in the compressed textures 14. For example, the trained machine learning model 40 may identify patterns that recur in the grass used for the scene and/or features that reappear in bricks that are used in the scene.

For example, the trained machine learning model 40 may use a trained Machine Learning Adversarial Network to block compress images and predict the best modes, shapes, and/or end points to use based on the learning achieved during a training phase of the adversarial network. For example, the machine learning networks may create a set of metadata for each iteration performed during the block compression that generates the best results. The machine learning networks may compare the block compressed image against a perfect image until the blocked compressed image is a close as possible to the original source image 23. When the comparison determines that the block compressed image is a close as possible to the original source image 23 (e.g., a measurement of error 25 is below a threshold value), the metadata may be saved as one or more hints 20.

Different machine learning networks or models may be trained for different texture types (e.g., normal map, diffuse, light map, etc.) and/or different content types (e.g., brick, grass, metal, skin, etc.). As such, depending on the type and/or content of the compressed textures 14, the machine learning networks may provide different predictions for the best modes, shapes, and/or endpoints to use during the block compression.

The one or more hints 20 may also be used to guide the Machine Learning network, for example, to accept or reject the first result the network may provide for an individual block, knowing that if machine learning network was sent back to take a second guess, the second guess will be better. In addition, the one or more hints 20 may be used to apply weights to the machine learning network in order to steer the predicted outcome towards a higher quality result.

Search space component 32 may generate a metadata file 16 with the one or more hints 20. Hints 20 may be for a region of a texture 26. As such, the same hint 20 may be used for entire areas of the texture 26. An example hint 20 may include a pre-decided shape to use when performing block compression on the texture 26. Another example hint 20 may include a spatial structure of possible shapes to use when performing block compression on the texture 26.

In an implementation, the metadata file 16 may be compressed. For example, search space component 32 may compress the metadata file 16 using a lossless compressor, such as, but not limited to, Huffman, zip, lmza.

Referring back to FIG. 1, computer device 102 may download a graphics-based application 10, such as, but not limited to, a game, with the compressed textures 14 and/or metadata file 16 from computer device 106 via, for example, a wired and/or wireless network 104. Network 104 may also include optical media, a hard disk, or any other type of storage. In another implementation, the compressed textures 14 and/or metadata file 16 may be saved on optical media or hard disk.

Computer device 102 may include an operating system 110 executed by processor 34 and/or memory 36. Memory 36 of computer device 102 may be configured for storing data and/or computer-executable instructions defining and/or associated with operating system 110, and processor 34 may execute such data and/or instructions to instantiate operating system 110. An example of memory 36 can include, but is not limited to, a type of memory usable by a computer, such as random access memory (RAM), read only memory (ROM), tapes, magnetic discs, optical discs, volatile memory, non-volatile memory, and any combination thereof. An example of processor 34 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Operating system 110 and/or application 10 may include a compression engine 18 that may convert the received compressed textures 14 into a hardware compatible compressed texture 22 usable by the GPU. The received compressed textures 14 may not be directly usable by the GPU. As such, compression engine 18 may transform the received compressed textures 14 into a hardware compatible compressed texture 22 using, for example, block compression.

At runtime of application 10, compression engine 18 may decompress the compressed textures 14 into decompressed textures 15. For example, decompressed textures 15 may be a traditional 1 to 4 channel image directly readable by the GPU. In an implementation, compression engine 18 may decompress the compressed textures 14 at an install time of application 10 when application 10 is, for example, being downloaded from the Internet and/or copied from optical media or the hard disk.

Compression engine 18 may use one or more hints 20 from metadata file 16 to quickly convert the decompressed textures 15 to a hardware compatible compressed texture 22, such as, but not limited to, a block compressed number BCN image, ericsson texture compression (ETC), and/or adaptive scalable texture compression (ATSC). For example, the hints 20 may indicate that an identified texture 26 may only use modes 1 and 2 of 8 different modes. In addition, the hints 20 may indicate which shapes are common shapes for the identified texture 26 and/or a sub region of the texture 26. The hints 20 may also provide information regarding a subset of the search space defined by a subset of one or more of the mode, the shape, or the endpoints to choose for compressing the decompressed textures into hardware compatible compressed textures that includes less than all of the potential combinations that make up the search space. For example, the subset may include one or more of the mode, the shape, or the endpoints, or one or more of a combination of the mode, the shape, or the endpoints. The hints 20 may be used by compression engine 18 to reduce the search space when determining which components to use for the textures 26 when compressing the textures 26 at runtime. As such, the hints 20 may speed up a block compression of the decompressed textures 15 when generating the hardware compatible compressed textures 22 and/or may improve the quality of the hardware compatible compressed textures 22.

The hardware compatible compressed textures 22 may be stored in memory 36. In addition, compression engine 18 may transmit the hardware compatible compressed textures 22 to GPU 24 for rendering. GPU 24 may render the hardware compatible compressed textures 22 into one or more textures 26 and may transmit the one or more textures 26 for presentation on display 28 for application 10. As such, as a user plays application 10 and moves from one scene to another scene of application 10, the textures 26 presented on display 28 may be updated.

For example, a racing game of the world may be able to have longer views of the world (e.g., where a user can see further into the distance) and/or have cars go faster. As the cars move around the world, computer device 102 may be constantly streaming compressed textures 14 for the racing game. As such, compression engine 18 may be constantly converting the compressed textures 14 into different hardware compatible compressed textures 22 in real time using the one or more hints 20 so that a user may be able to have longer views of the world and/or move through the world faster.

Figure 3:
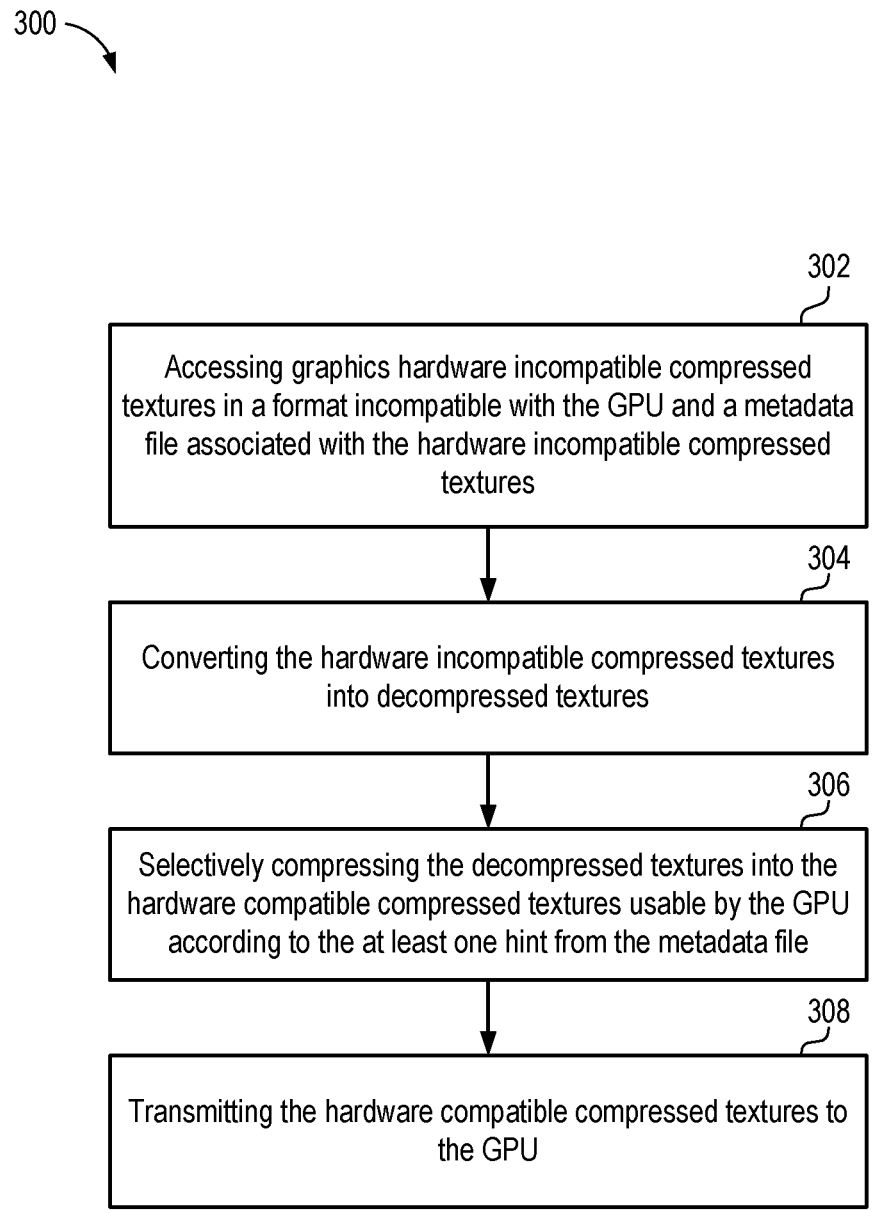
FIG. 3 is an example method flow for real time texture compression in accordance with an implementation of the present disclosure.

Referring now to FIG. 3, a method flow 300 for real time texture compression at a runtime of application 10 (FIG. 1), and/or installation or storing of compressed textures of application 10, by computer device 102 (FIG. 1) is discussed in connection with the description of the architecture of FIGS. 1 and 2.

At 302, method 300 may include accessing graphics hardware incompatible compressed textures in a format incompatible with the GPU, and a metadata file associated with hardware incompatible compressed textures. The graphics hardware incompatible compressed textures 14 may be accessed at an install time of application 10 (e.g., when the graphics hardware incompatible compressed textures 14 are downloaded over the internet and/or copied from the hard disk or optical media. In addition, at runtime of application 10, the graphics hardware incompatible compressed textures 14 may be accessed by computer device 102 from the memory 36, e.g., the hard disk, optical media, and/or downloaded to the memory 36 over the internet, and executed by the processor 34, e.g., under control of the operating system 110.

Application 10 may include one or more textures 26 included in one or more scenes or images associated with scenes of application 10. Textures 26 may provide information about an image rendered in the application 10. For example, textures 26 may include a bitmap of pixel colors that give an object the appearance of texture. Textures 26 may be used by game developers to create realism in application 10 and/or computer games by providing detailed surfaces and/or colors. For example, textures 26 may be used to make a concrete barrier in a scene of application 10 look realistic. Another example may include a plurality of textures 26 being layered to make a player's skin look realistic. For example, the texture 26 may include one or more texture layers, such as one texture layer that may include veins to include in the skin, while another texture layer emulates light absorption on the skin, and another texture layer may be used to emulate sweat on the player's skin. Another example may include using a variety of textures 26 to make grass in the scene look realistic. As such, variations of textures 26 may be used by game developers to make scenes of application 10 look realistic. Textures 26 may include blocks of texels 27 (up to m, where m is an integer). For example, the blocks of texels 27 may be, but not limited to, a 4×4, 8×4, 4×8, and/or an 8×8 block of texels 27. Each texels may be a pixel in the texture 26 and may also be the smallest unit of a texture that can be read or written to. Each block of texels 27 may contain 1 to 4 related components, such as, but not limited to, RGB, RGBA, XY and/or XYZ, additionally a number of endpoints, indices indicating how to interpolate between the colors, one or more shapes, and one or more modes. For instance, in one implementation that should not be construed as limiting, an example block of texels 27 may be of 1 of 8 modes, each with up to 32 shapes, each with 2 to 4 endpoints, and indices per texel describing how to interpolate between those end points. As such, these components define a search space for determining a manner in which to compress the texture 26.

Application 10 may include compressed textures 14 so that when application 10 is transmitted to computer device 102 and/or stored in memory 36, the size of application 10 is greatly reduced, and thus, reducing input/output bandwidth and/or the size of application 10 on the hard disk, optical media, or downloaded over the internet. For example, the compressed textures 14 may be compressed using any one of a plurality of compression algorithms or schemes that are incompatible with the GPU, but which provide a substantially greater compression ratio as compared to a GPU-compatible compression algorithm/scheme (e.g., block compression). For example, the compressed textures 14 may be compressed using machine learning image compression, JPEG, wavelet, general purpose lossless compression, and/or other forms of compression that result in a relatively high compression ratio. As noted, however, the compressed textures 14 may not be directly usable by the GPU. The compressed textures may be generated offline using one or more computer devices 106.

At 304, method 300 may include converting the hardware incompatible compressed textures into the decompressed textures. At runtime of application 10, compression engine 18 may decompress the compressed textures 14 into decompressed textures 15. For example, decompressed textures 15 may be a traditional 1 to 4 channel image. In addition, compression engine 18 may decompress the compressed textures 14 into decompressed textures 15 at an install time of application 10, such as, when application 10 is downloaded over the Internet and/or copied from the hard disk or optical media.

At 306, method 300 may include selectively compressing the decompressed textures into the hardware compatible compressed textures usable by the GPU according to the at least one hint from the metadata file. Application 10 may also include a metadata file 16 with one or more hints 20 (e.g., up to n hints, where n is an integer) that provides information as to which mode, shape and/or end points to choose for every block of texels 27 when block compressing the texture 26 for application 10 at runtime. For example, the hints 20 may indicate that while there may be 8 different modes for an identified block of texels 27, this identified texture 26 only uses modes 1 and 2. In addition or alternatively, for example, the hints 20 may indicate which shapes are common shapes for the identified texture 26 and/or a sub region of the texture 26. The hints 20 may also provide information regarding a subset of the search space defined by a subset of one or more of the mode, the shape, or the endpoints to choose for compressing the decompressed textures into hardware compatible compressed textures that includes less than all of the potential combinations that make up the search space. For example, the subset may include one or more of the mode, the shape, or the endpoints, or one or more of a combination of the mode, the shape, or the endpoints. As such, the hints 20 may be used to reduce the search space when determining how to efficiently compress the textures 26 at runtime and/or improve the quality of the hardware compatible compressed textures 22.

Reducing the search space for block compressing the textures 26 may speed up the recompression of textures from a GPU incompatible compressed form, to a GPU compatible compressed form. As such, by having the capability to quickly create the GPU compatible compressed textures, the size of games downloaded from the internet may be reduced and/or provide more content onto the fixed size optical media by using the GPU incompatible texture compression techniques. In addition, users may be able to install more games on their hard disk at once. In addition, allow more resources of computer device 102 to may be available for displaying application 10. Moreover, by reducing the amount of data to stream off of the disk (by storing the textures as compressed textures 14), additional resources of computer device 102 may be available for other portions of application 10. For example, application 10 may have more space for audio or a wider variety of meshes may be provided.

The metadata file 16 may be generated offline using one or more computer devices 106. Computer device 106 may also include a search space component 32 that may test options in the search space to determine a configuration for a block compression of decompressed textures. The search space component 32 may identify one or more hints 20 to provide when compressing the textures 26. The one or more hints 20 may provide information, such as, but not limited to, guidance as to which modes, shapes, and/or end points may produce the best quality blocks when compressing the textures 26 into a hardware compatible compressed texture 22.

Compression engine 18 may use one or more hints 20 from metadata file 16 to quickly convert the decompressed textures 15 at a runtime of application 10 to a hardware compatible compressed texture 22, such as, but not limited to, a block compressed number BCN image. In an implementation, compression engine 18 may use one or more hints 20 from metadata file 16 to quickly convert the decompressed textures 15 to a hardware compatible compressed texture 22 at an install time of application 10, and the hardware compatible compressed textures 22 may be stored in memory 36. Hints 20 may improve the quality of the hardware compatible compressed textures 22 and may reduce the background processing that may be required during the installation of application 10.

For example, the hints 20 may indicate that an identified region of the texture 26 may only use modes 1 and 2 of 8 different modes. In addition, the hints 20 may indicate which shapes are common shapes for the identified texture 26 and/or a sub region of the texture 26. The hints 20 may be used by compression engine 18 to reduce the search space when determining which components to use for the textures 26 when compressing the textures 26 at runtime. As such, the hints 20 may speed up a block compression of the decompressed textures 15 when generating the hardware compatible compressed textures 22 and/or may improve the quality of the hardware compatible compressed textures 22.

At 308, method 300 may include transmitting the hardware compatible compressed textures to the GPU. Compression engine 18 may transmit the hardware compatible compressed textures 22 to GPU 24 for rendering. GPU 24 may render the hardware compatible compressed textures 22 into one or more textures 26 and may transmit the one or more textures 26 for presentation on display 28 for application 10. As such, as a user plays application 10 and moves from one scene to another scene of application 10, the textures 26 presented on display 28 may be updated.

Figure 4:
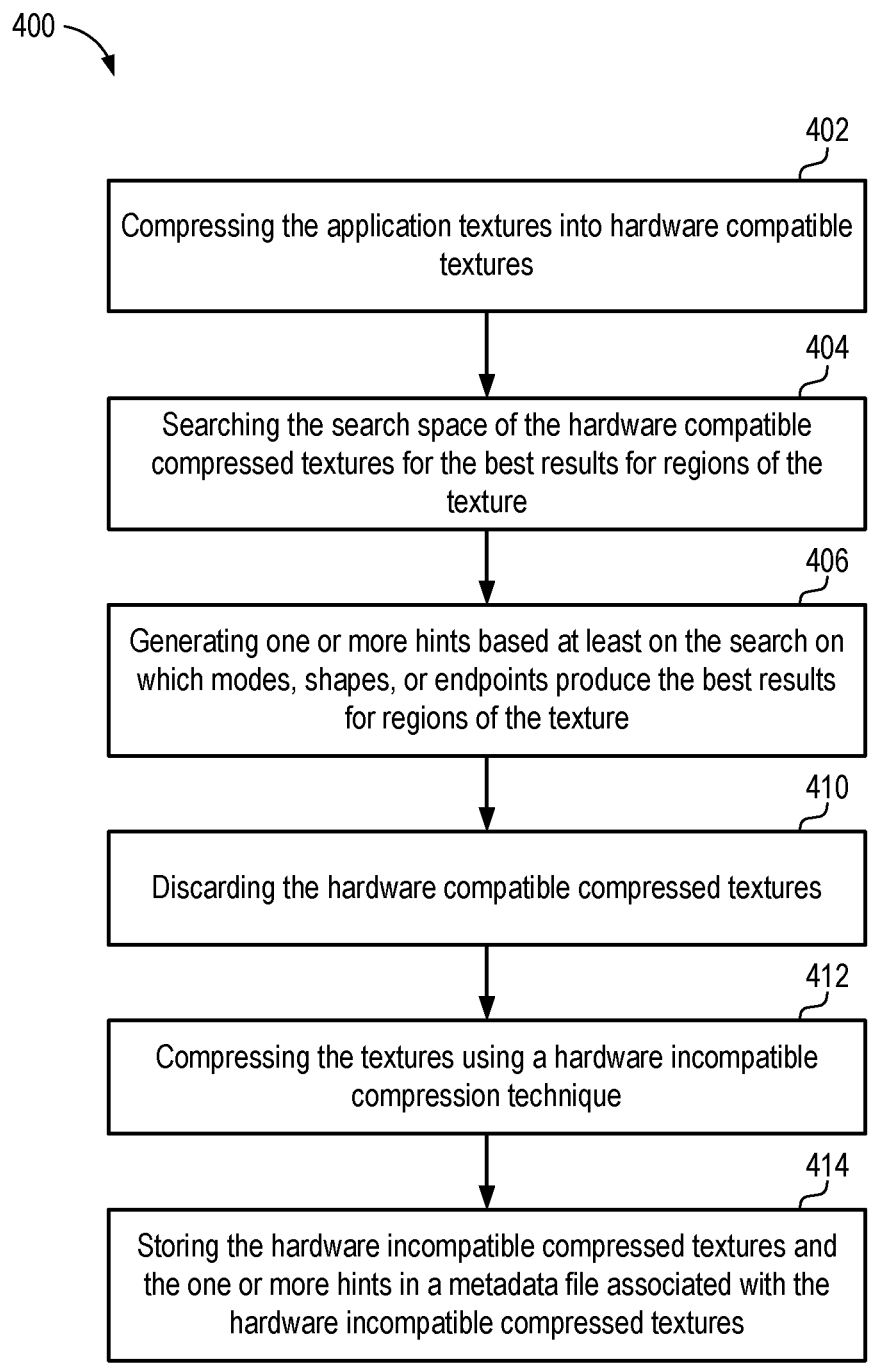
FIG. 4 is an example method flow for generating a metadata file by searching the search space in accordance with an implementation of the present disclosure.

Referring now to FIG. 4, a method flow 400 for generating a metadata file 16 (FIG. 1) using a compression configuration searcher 38 (FIG. 2) may be performed by computer device 106 (FIG. 1) is discussed in connection with the description of the architecture of FIGS. 1 and 2. Method 400 may be performed offline to avoid time and resource constraints associated with efficiently compressing textures having a large search space.

At 402, method 400 may include compressing the application textures into hardware compatible textures. Computer device 106 may include a compression engine 30 that receives the textures 26 for applications 10. Compression engine 30 may compress the textures 26 into hardware compatible compressed textures 22, such as a block compressed number (BCN) texture. For example, compression engine 30 may use one or more of a plurality of forms/techniques/algorithms of compression. The hardware compatible compressed textures 22 may include a plurality of texels that include one or more of a shape, a mode, or endpoints.

At 404, method 400 may include searching the search space of the hardware compatible compressed textures for the best results for regions of the textures. Search space component 32 may include a compression configuration searcher 38 that searches a full search space, or until a search limit is hit, of the hardware compatible compressed textures 22, such as a block compressed number (BCN) texture, to determine a best results for regions of the texture. Compression configuration searcher 38 may try every combination of mode, shape and/or end points of images 35. The end points may have a huge search space. For example, one end point can be any of the 16 colors in a block, while the other endpoint can be any of the other 15. Another example may include compression configuration searcher 38 selecting a color which is close to the colors used in the texture but does not feature in the original source image.

Compression configuration searcher 38 may determine a measurement of error 25 between the source image 23 and the hardware compatible compressed textures 22. Compression configuration searcher 38 may continue searching all combinations and take the lowest error 25, or compression configuration searcher 38 may terminate the search when an acceptable error threshold is hit (e.g., the measured error 25 is below the error threshold). By using the measurement of error 25, the quality of the hints 20 may be improved and/or an improvement in the quality of the hardware compatible compressed textures 22 may be achieved by selecting images that are within an error threshold of the source image 23. As such, the best results for regions of the hardware compatible compressed textures 22 may be based at least on the results obtained within the acceptable error threshold and/or when the lowest error 25 is hit.

In another implementation, compression may be time limited. As such, compression configuration searcher 38 may terminate the search within a certain time period and/or after a number of iterations are performed by compression configuration searcher 38. Thus, the best results for regions of the textures may be based on the results obtained within a certain time and/or a number of iterations performed by the search.

At 408, method 400 may include generating one or more hints based at least on the search on which modes, shapes, or endpoints produce the best results for regions of the texture. During the search performed by the compression configuration searcher 38 on the images 35, compression configuration searcher 38 may identify a configuration for a block compression of the hardware compatible compressed textures 22 having a measurement of error 25 within an error threshold associated with the testing of the search space, for example, by trying different combinations of shapes, end points, and/or modes. Once the compression configuration searcher 38 identifies the best configuration for the block, one or more hints 20 may be provided for the hardware compatible compressed texture 22, such as, the end points, the shapes, and/or the modes used when generating the configuration for the block that generated the best quality. The one or more hints 20 may provide information, such as, but not limited to, guidance as to which modes, shapes, and/or end points may produce the best quality blocks for the hardware compatible compressed texture 22.

At 410, method 400 may include discarding the hardware compatible compressed textures. Compression configuration searcher 38 may discard the hardware compatible compressed textures 22 upon completion of the search. The search may be complete, for example, when the best error is reached (e.g., the lowest error 25 is achieved), when an error tolerance is hit (e.g., the measured error 25 is below the error threshold), and/or when a time limit or iteration limit is hit.

At 412, method 400 may include compressing the textures using a hardware incompatible compression technique. For example, compression engine 30 may compress the textures 26 into hardware incompatible compressed textures 14. For example, compression engine 30 may use one or more of a plurality of forms/techniques/algorithms of compression, using GPU-incompatible formatting, and compare the results in order to identify a form of compression that results in a high compression ratio including, but not limited to, machine learning image compression, JPEG, and/or wavelet.

At 414, method 400 may include storing the hardware incompatible compressed textures and/or the one or more hints in a metadata file associated with the hardware incompatible compressed textures. Search space component 32 may generate a metadata file 16 with the one or more hints 20. In an implementation, the metadata file 16 may be compressed. For example, search space component 32 may compress the metadata file 16 using a lossless compressor, such as, but not limited to, Huffman, zip, lmza. An example hint 20 may include a pre-decided shape to use when performing block compression on the texture 26. Another example hint 20 may include a spatial structure of possible shapes to use when performing block compression on the texture 26.

Figure 5:
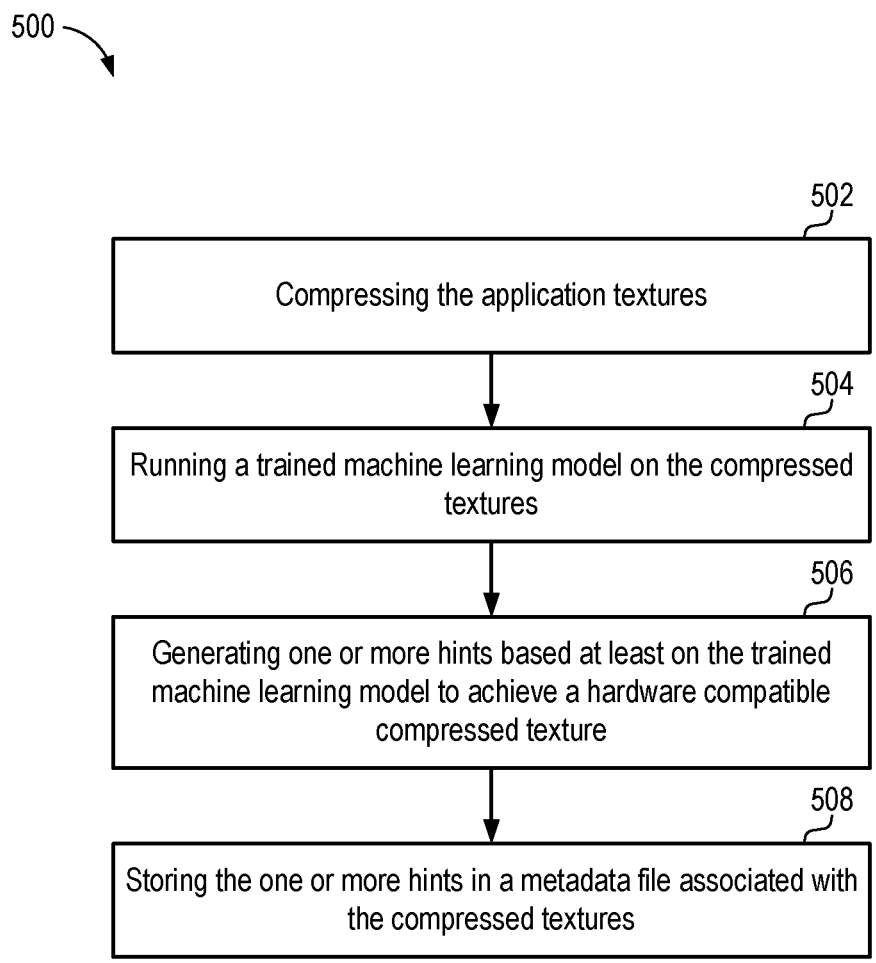
FIG. 5 is an example method flow for generating a metadata file using a trained machine learning search in accordance with an implementation of the present disclosure.

Referring now to FIG. 5, a method flow 500 for generating a metadata file 16 (FIG. 1) using a trained machine learning model 40 (FIG. 2) may be performed by computer device 106 (FIG. 1) is discussed in connection with the description of the architecture of FIGS. 1 and 2.

At 502, method 500 may include compressing the application textures. Computer device 106 may include a compression engine 30 that receives the textures 26 for the applications 10. Compression engine 30 may compress the textures 26 into compressed textures 14. For example, compression engine 30 may use one or more of a plurality of forms/techniques/algorithms of compression, using GPU-incompatible formatting, and compare the results in order to identify a form of compression that results in a high compression ratio including, but not limited to, machine learning image compression, JPEG, general purpose lossless compression, and/or wavelet.

At 504, method 500 may include running a trained machine learning model on the compressed textures. Search space component 32 may include a trained machine learning model 40 that may perform a trained machine learning search on the compressed textures 14 to predict which may be good compression options for each block. The trained machine learning model 40 may identify repetition and/or features that may be important in the compressed textures 14. For example, the trained machine learning model 40 may identify patterns that recur in the grass used for the scene and/or features that reappear in bricks that are used in the scene.

At 506, generating one or more hints based at least on the trained machine learning model to achieve a hardware compatible compressed texture. For example, the trained machine learning model 40 may use a trained Machine Learning Adversarial Network to block compress images and predict the best modes, shapes, and/or end points to use based on the learning achieved during a training phase of the adversarial network. For example, the machine learning networks may create a set of metadata for each iteration performed during the block compression that generates the best results. The machine learning networks may compare the block compressed image against a perfect image until the blocked compressed image is a close as possible to the original source image 23. When the comparison determines that the block compressed image is a close as possible to the original source image 23 (e.g., a measurement of error 25 is below a threshold value), the metadata may be saved as one or more hints 20.

Different machine learning networks or models may be trained for different texture types (e.g., normal map, diffuse, light map, etc.) and/or different content types (e.g., brick, grass, metal, skin, etc.). As such, depending on the type and/or content of the compressed textures 14, the machine learning networks may provide different predictions for the best modes, shapes, and/or endpoints to use during the block compression.

The one or more hints 20 may also be used to guide the Machine Learning network, for example, to accept or reject the first result the network may provide for an individual block, knowing that if machine learning network was sent back to take a second guess, the second guess will be better. In addition, the one or more hints 20 may be used to apply weights to the machine learning network in order to steer the predicted outcome towards a higher quality result.

At 508, method 500 may include storing the one or more hints in a metadata file associated with the compressed textures. Search space component 32 may generate a metadata file 16 with the one or more hints 20. In an implementation, the metadata file 16 may be compressed. For example, search space component 32 may compress the metadata file 16 using a lossless compressor, such as, but not limited to, Huffman, zip, lmza. An example hint 20 may include a pre-decided shape to use when performing block compression on the texture 26. Another example hint 20 may include a spatial structure of possible shapes to use when performing block compression on the texture 26.

Figure 6:
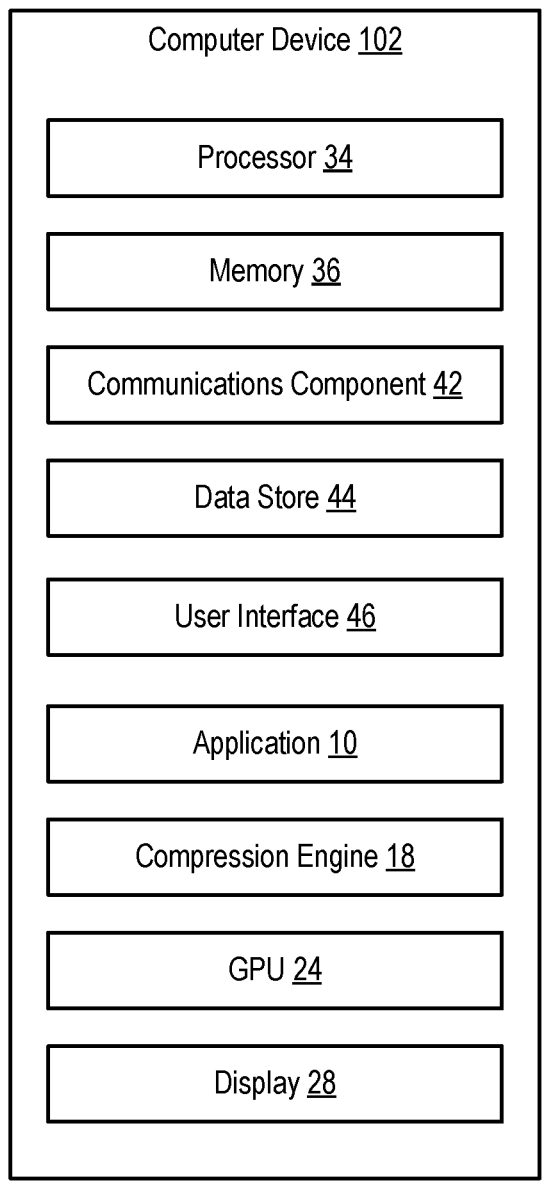
FIG. 6 is a schematic block diagram of an example device in accordance with an implementation of the present disclosure.

Referring now to FIG. 6, illustrated is an example computer device 102 in accordance with an implementation, including additional component details as compared to FIG. 1. In one example, computer device 102 may include processor 34 for carrying out processing functions associated with one or more of components and functions described herein. Processor 34 can include a single or multiple set of processors or multi-core processors. Moreover, processor 34 can be implemented as an integrated processing system and/or a distributed processing system.

Computer device 102 may further include memory 36, such as for storing local versions of applications being executed by processor 34. Memory 36 can include a type of memory usable by a computer, such as random access memory (RAM), read only memory (ROM), tapes, magnetic discs, optical discs, volatile memory, non-volatile memory, and any combination thereof. Additionally, processor 34 and memory 36 may include and execute operating system 110 (FIG. 1).

Further, computer device 102 may include a communications component 42 that provides for establishing and maintaining communications with one or more parties utilizing hardware, software, and services as described herein. Communications component 42 may carry communications between components on computer device 102, as well as between computer device 102 and external devices, such as devices located across a communications network and/or devices serially or locally connected to computer device 102. For example, communications component 42 may include one or more buses, and may further include transmit chain components and receive chain components associated with a transmitter and receiver, respectively, operable for interfacing with external devices.

Additionally, computer device 102 may include a data store 44, which can be any suitable combination of hardware and/or software, that provides for mass storage of information, databases, and programs employed in connection with implementations described herein. For example, data store 44 may be a data repository for applications 10 (FIG. 1), compression engine 18 (FIG. 1), GPU 24 (FIG. 1), and/or display 28 (FIG. 1).

Computer device 102 may also include a user interface component 46 operable to receive inputs from a user of computer device 102 and further operable to generate outputs for presentation to the user. User interface component 46 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 46 may include one or more output devices, including but not limited to a display, a speaker, a haptic feedback mechanism, a printer, any other mechanism capable of presenting an output to a user, or any combination thereof.

In an implementation, user interface component 46 may transmit and/or receive messages corresponding to the operation of applications 10, compression engine 18, GPU 24, and/or display 28. In addition, processor 34 executes applications 10, compression engine 18, GPU 24, and/or display 28, and memory 36 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a graphics processing unit (GPU);
   a memory to store data and instructions including an application, graphics hardware incompatible compressed textures in a format incompatible with the GPU, and a metadata file associated with the graphics hardware incompatible compressed textures;
   a processor in communication with the memory;
   an operating system in communication with the memory, the processor, the GPU, and the application, wherein the application is operable to:
      access the metadata file and the graphics hardware incompatible compressed textures, wherein the metadata file includes at least one hint generated by testing options in a search space by trying different combinations of a plurality of modes, shapes, and endpoints for determining a configuration for a block compression of decompressed textures having a measurement of error between a source image and hardware compatible compressed textures within an error threshold;
      convert the graphics hardware incompatible compressed textures into the decompressed textures using the configuration for the block compression, wherein the configuration for the block compression identifies at least one of a mode, a shape, or an endpoint of the plurality of modes, shapes, and endpoints to use for compression of the decompressed textures from the graphics hardware incompatible compressed textures into hardware compatible compressed textures;
      selectively compress the decompressed textures into the hardware compatible compressed textures usable by the GPU using the at least one of the mode, the shape, or the endpoint identified by the at least one hint from the metadata file; and
      transmit the hardware compatible compressed textures to the GPU.

2. The computer device of claim 1, wherein the at least one hint reduces a search space of a compression algorithm used to compress the decompressed textures into the hardware compatible compressed textures.

3. The computer device of claim 2, wherein the at least one hint is generated offline by testing the search space to determine a configuration for the block compression of the decompressed textures having a measurement of error below an error threshold.

4. The computer device of claim 2, wherein the decompressed textures include a plurality of block of texels where each block of texels of the plurality of block of texels includes at least one or more of a shape, a mode, or end points.

5. The computer device of claim 4, wherein the at least one hint provides information regarding a subset of the search space defined by a subset of the one or more of the mode, the shape, or the end points to choose for compressing the decompressed textures into the hardware compatible compressed textures.

6. The computer device of claim 2, wherein the at least one hint is generated by performing a trained machine learning search on the hardware compatible compressed textures to predict compression options for each block of the hardware compatible compressed textures.

7. The computer device of claim 6, wherein different machine learning searches are trained for one or more of different texture types and different content types.

8. The computer device of claim 1, wherein the hardware compatible compressed textures are in a format of a block compressed number (BCN) texture, and wherein the GPU is further configured to render textures from the hardware compatible compressed textures to present on a display.

9. The computer device of claim 1, wherein the graphics hardware incompatible compressed textures have a compression ratio substantially greater than the hardware compatible compressed textures usable by the GPU.

10. The computer device of claim 1, wherein the measurement of error improves a quality of the hardware compatible compressed texture by selecting images within the error threshold of the source image.

11. The computer device of claim 1, wherein the at least one hint is further generated by testing options in a search space by trying different combinations of the modes, the shapes, and the endpoints within a time period to determine the configuration for the block compression of the decompressed textures.

12. A method for real time texture compression executed on a computer device, comprising:
   accessing, by an application executing on the computer device, graphics hardware incompatible compressed textures in a format incompatible with a graphics processing unit (GPU), and a metadata file associated with the graphics hardware incompatible compressed textures, wherein the metadata file includes at least one hint generated by testing options in a search space by trying different combinations of a plurality of modes, shapes, and endpoints for determining a configuration for a block compression of decompressed textures having a measurement of error between a source image and hardware compatible compressed textures within an error threshold;

converting the graphics hardware incompatible compressed textures into the decompressed textures using the configuration for the block compression, wherein the configuration for the block compression identifies at least one of a mode, a shape, or an endpoint of the plurality of modes, shapes, and endpoints to use for compression of the decompressed textures from the graphics hardware incompatible compressed textures into hardware compatible compressed textures;

selectively compressing the decompressed textures into the hardware compatible compressed textures usable by the GPU using the at least one of the mode, the shape, or the endpoint identified by the at least one hint from the metadata file; and transmitting the hardware compatible compressed textures to the GPU.

13. The method of claim 12, wherein the at least one hint reduces a search space of a compression algorithm used to compress the decompressed textures into the hardware compatible compressed textures.

14. The method of claim 13, wherein the at least one hint is generated offline by testing the search space to determine a configuration for the block compression of the decompressed textures having a measurement of error below an error threshold.

15. The method of claim 13, wherein the decompressed textures include a plurality of block of texels where each block of texels of the plurality of block of texels includes at least one or more of a shape, a mode, or end points.

16. The method of claim 15, wherein the at least one hint provides information regarding a subset of the search space defined by a subset of the one or more of the mode, the shape, or the end points to choose for compressing the decompressed textures into the hardware compatible compressed textures.

17. The method of claim 13, wherein the at least one hint is generated by performing a trained machine learning search on the hardware compatible compressed textures to predict compression options for each block of the hardware compatible compressed textures.

18. The method of claim 17, wherein different machine learning searches are trained for one or more of different texture types and different content types.

19. The method of claim 12, wherein the hardware compatible compressed textures are in a format of a block compressed number (BCN) texture, and wherein the GPU is further configured to render textures from the hardware compatible compressed textures to present on a display.

20. The method of claim 12, wherein the graphics hardware incompatible compressed textures have a compression ratio substantially greater than the hardware compatible compressed textures usable by the GPU.

21. A non-transitory computer-readable medium storing instructions executable by a computer device, comprising:
at least one instruction for causing the computer device to access graphics hardware incompatible compressed textures in a format incompatible with a graphics processing unit (GPU), and a metadata file associated with the graphics hardware incompatible compressed textures, wherein the metadata file includes at least one hint generated by testing options in a search space by trying different combinations of a plurality of modes, shapes, and endpoints for determining a configuration for a block compression of decompressed textures having a measurement of error between a source image and hardware compatible compressed textures within an error threshold;

at least one instruction for causing the computer device to convert the graphics hardware incompatible compressed textures into the decompressed textures using the configuration for the block compression, wherein the configuration for the block compression identifies at least one of a mode, a shape, or an endpoint of the plurality of modes, shapes, and endpoints to use for compression of the decompressed textures from the graphics hardware incompatible compressed textures into hardware compatible compressed textures;

at least one instruction for causing the computer device to selectively compress the decompressed textures into the hardware compatible compressed textures usable by the GPU using the at least one of the mode, the shape, or the endpoint identified by the at least one hint from the metadata file; and at least one instruction for causing the computer device to transmit the hardware compatible compressed textures to the GPU.

* * * * *